US010382942B2

United States Patent
Coulis et al.

(10) Patent No.: US 10,382,942 B2
(45) Date of Patent: Aug. 13, 2019

(54) SYSTEM AND METHOD FOR ESTABLISHING A WIRELESS CONNECTION BETWEEN POWER TOOL AND MOBILE DEVICE

(71) Applicant: MILWAUKEE ELECTRIC TOOL CORPORATION, Brookfield, WI (US)

(72) Inventors: Christian Paul Coulis, Sussex, WI (US); Jason Glenn Rothman, Milwaukee, WI (US); Steven M. Stefanik, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/164,960

(22) Filed: Oct. 19, 2018

(65) Prior Publication Data
US 2019/0053032 A1   Feb. 14, 2019

Related U.S. Application Data

(63) Continuation of application No. 15/615,214, filed on Jun. 6, 2017, now Pat. No. 10,149,142.
(Continued)

(51) Int. Cl.
*H04Q 5/22* (2006.01)
*H04W 8/00* (2009.01)
(Continued)

(52) U.S. Cl.
CPC .......... *H04W 8/005* (2013.01); *H04W 76/10* (2018.02); *G06Q 10/087* (2013.01); *H04L 41/0806* (2013.01); *H04W 4/70* (2018.02)

(58) Field of Classification Search
None
See application file for complete search history.

(56) References Cited

U.S. PATENT DOCUMENTS

| 3,597,742 A | 8/1971 | Phillips et al. |
|---|---|---|
| 3,882,305 A | 5/1975 | Johnstone |

(Continued)

FOREIGN PATENT DOCUMENTS

| DE | 3803357 | 8/1989 |
|---|---|---|
| DE | 10029132 | 1/2002 |

(Continued)

OTHER PUBLICATIONS

Bosch Media Service "Power Tools" Bosch Press Release, Mar. 3, 2016 (3 pages).
(Continued)

*Primary Examiner* — Adolf Dsouza
(74) *Attorney, Agent, or Firm* — Michael Best & Friedrich LLP

(57) ABSTRACT

A method and system for connecting a power tool with a mobile device. The mobile device receives a user request to connect to a power tool and transmits a short-range advertisement. The power tool receives the short-range advertisement and transmits a signal. The mobile device receives the signal from the power tool and determines a signal strength. The mobile device compares the signal strength to a predetermined signal strength value. When the signal strength value exceeds the predetermined signal strength value, the mobile device connects with the power tool.

18 Claims, 10 Drawing Sheets

Related U.S. Application Data

(60) Provisional application No. 62/346,421, filed on Jun. 6, 2016.

(51) Int. Cl.
| | |
|---|---|
| *H04W 76/10* | (2018.01) |
| *H04W 4/70* | (2018.01) |
| *G06Q 10/08* | (2012.01) |
| *H04L 12/24* | (2006.01) |

(56) References Cited

U.S. PATENT DOCUMENTS

| | | |
|---|---|---|
| 4,545,106 A | 10/1985 | Juengel |
| 4,854,786 A | 8/1989 | Alexander et al. |
| 5,315,501 A | 5/1994 | Whitehouse |
| 5,398,946 A | 3/1995 | Quiring |
| 5,903,462 A | 5/1999 | Wagner et al. |
| 6,005,489 A | 12/1999 | Siegle et al. |
| 6,123,241 A | 9/2000 | Walter et al. |
| 6,157,313 A | 12/2000 | Emmermann |
| 6,161,629 A | 12/2000 | Hohmann et al. |
| 6,225,906 B1 | 5/2001 | Shore |
| 6,279,668 B1 | 8/2001 | Mercer |
| 6,343,276 B1 | 1/2002 | Barnett |
| 6,405,598 B1 | 6/2002 | Bareggi |
| 6,469,615 B1 | 10/2002 | Kady et al. |
| 6,520,270 B2 | 2/2003 | Wissmach et al. |
| 6,522,949 B1 | 2/2003 | Ikeda et al. |
| 6,655,473 B1 | 12/2003 | Chi |
| 6,668,212 B2 | 12/2003 | Colangelo, II et al. |
| 6,768,994 B1 | 1/2004 | Howard et al. |
| 6,784,801 B2 | 8/2004 | Watanabe et al. |
| 6,848,516 B2 | 2/2005 | Giardino |
| 6,872,121 B2 | 3/2005 | Wiener et al. |
| 6,913,087 B1 | 7/2005 | Brotto et al. |
| 6,923,285 B1 | 8/2005 | Rossow et al. |
| 6,938,689 B2 | 9/2005 | Farrant et al. |
| 6,954,048 B2 | 10/2005 | Cho |
| 6,981,311 B2 | 1/2006 | Seith et al. |
| 6,992,585 B2 | 1/2006 | Saleh et al. |
| 7,034,711 B2 | 4/2006 | Sakatani et al. |
| 7,035,710 B2 | 4/2006 | Balling |
| 7,035,898 B1 | 4/2006 | Baker |
| 7,050,907 B1 | 5/2006 | Janky et al. |
| 7,064,502 B2 | 6/2006 | Garcia et al. |
| 7,102,303 B2 | 9/2006 | Brotto et al. |
| 7,117,169 B2 | 10/2006 | Zara et al. |
| 7,123,149 B2 | 10/2006 | Nowak et al. |
| 7,211,972 B2 | 5/2007 | Garcia et al. |
| 7,218,227 B2 | 5/2007 | Davis et al. |
| 7,298,240 B2 | 11/2007 | Lamar |
| 7,319,395 B2 | 1/2008 | Puzio et al. |
| 7,328,086 B2 | 2/2008 | Perry et al. |
| 7,328,757 B2 | 2/2008 | Davies |
| 7,336,181 B2 | 2/2008 | Nowak et al. |
| 7,339,477 B2 | 3/2008 | Puzio et al. |
| 7,346,422 B2 | 3/2008 | Tsuchiya et al. |
| 7,359,762 B2 | 4/2008 | Etter et al. |
| 7,382,272 B2 | 6/2008 | Feight |
| 7,383,882 B2 | 6/2008 | Lerche et al. |
| 7,391,326 B2 | 6/2008 | Puzio et al. |
| 7,431,682 B2 | 10/2008 | Zeiler et al. |
| 7,437,204 B2 | 10/2008 | Lev-Ami et al. |
| 7,464,769 B2 | 12/2008 | Nakazawa et al. |
| 7,468,650 B2 | 12/2008 | Childress et al. |
| 7,613,590 B2 | 11/2009 | Brown |
| 7,627,503 B1 | 12/2009 | Champagne et al. |
| 7,646,155 B2 | 1/2010 | Woods et al. |
| 7,649,464 B2 | 1/2010 | Puzio et al. |
| RE41,185 E | 3/2010 | Gilmore et al. |
| 7,690,569 B2 | 4/2010 | Swanson et al. |
| 7,750,811 B2 | 7/2010 | Puzio et al. |
| 7,755,482 B2 | 7/2010 | Hubbard |
| 7,784,104 B2 | 8/2010 | Innami et al. |
| 7,787,981 B2 | 8/2010 | Austin et al. |
| 7,809,495 B2 | 10/2010 | Leufen |
| 7,817,062 B1 | 10/2010 | Li et al. |
| 7,834,566 B2 | 11/2010 | Woods et al. |
| 7,850,071 B2 | 12/2010 | Sakamoto et al. |
| 7,868,591 B2 | 1/2011 | Phillips et al. |
| 7,898,403 B2 | 3/2011 | Ritter et al. |
| 7,911,379 B2 | 3/2011 | Cameron |
| 7,928,673 B2 | 4/2011 | Woods et al. |
| 7,928,845 B1 | 4/2011 | LaRosa |
| 7,931,096 B2 | 4/2011 | Saha |
| 7,941,330 B1 | 5/2011 | Buentello et al. |
| 7,942,084 B2 | 5/2011 | Wilson, Jr. et al. |
| 7,942,211 B2 | 5/2011 | Scrimshaw et al. |
| 7,953,965 B2 | 5/2011 | Qin et al. |
| 7,982,624 B2 | 7/2011 | Richter et al. |
| 8,004,397 B2 | 8/2011 | Forrest et al. |
| 8,004,664 B2 | 8/2011 | Etter et al. |
| 8,005,647 B2 | 8/2011 | Armstrong et al. |
| 8,041,591 B2 | 10/2011 | Kawai et al. |
| 8,044,796 B1 | 10/2011 | Carr, Sr. |
| 8,049,636 B2 | 11/2011 | Buckingham et al. |
| 8,159,345 B2 | 4/2012 | Stevens |
| 8,161,613 B2 | 4/2012 | Schuele et al. |
| 8,169,298 B2 | 5/2012 | Wiesner et al. |
| 8,210,275 B2 | 7/2012 | Suzuki et al. |
| 8,255,358 B2 | 8/2012 | Ballew et al. |
| 8,260,452 B2 | 9/2012 | Austin et al. |
| 8,264,374 B2 | 9/2012 | Obatake et al. |
| 8,280,784 B2 | 10/2012 | Hurtis et al. |
| 8,281,871 B2 | 10/2012 | Cutler et al. |
| 8,294,424 B2 | 10/2012 | Bucur |
| 8,306,836 B2 | 11/2012 | Nichols et al. |
| 8,330,426 B2 | 12/2012 | Suzuki et al. |
| 8,344,879 B2 | 1/2013 | Harmon et al. |
| 8,351,982 B2 | 1/2013 | Rofougaran |
| 8,406,697 B2 | 3/2013 | Arimura et al. |
| 8,412,179 B2 | 4/2013 | Gerold et al. |
| 8,438,955 B2 | 5/2013 | Wilson, Jr. et al. |
| 8,464,808 B2 | 6/2013 | Leü |
| 8,493,243 B2 | 7/2013 | Ahmadi et al. |
| 8,576,095 B2 | 11/2013 | Harmon et al. |
| 8,589,273 B2 | 11/2013 | Creeden et al. |
| 8,611,250 B2 | 12/2013 | Chen et al. |
| 8,645,176 B2 | 2/2014 | Walton et al. |
| 8,657,482 B2 | 2/2014 | Malackowski et al. |
| 8,666,936 B2 | 3/2014 | Wallace |
| 8,776,644 B2 | 7/2014 | Harper et al. |
| 8,928,463 B2 | 1/2015 | Landau et al. |
| 8,965,841 B2 | 2/2015 | Wallace |
| 8,970,377 B2 | 3/2015 | Heine et al. |
| 8,996,237 B2 | 3/2015 | Bertosa et al. |
| 9,031,585 B2 | 5/2015 | Kahle et al. |
| 9,092,753 B1 | 7/2015 | Fanelli |
| 9,094,793 B2 | 7/2015 | Kusakari et al. |
| 9,111,234 B2 | 8/2015 | Wallace et al. |
| 9,126,317 B2 | 9/2015 | Lawton et al. |
| 9,177,488 B2 | 11/2015 | Chontos et al. |
| 9,216,505 B2 | 12/2015 | Rejman et al. |
| 9,232,614 B2 | 1/2016 | Hiroi |
| 9,233,457 B2 | 1/2016 | Wanek et al. |
| 9,281,770 B2 | 3/2016 | Wood et al. |
| 9,298,803 B2 | 3/2016 | Wallace |
| 9,386,907 B2 | 7/2016 | Vazales et al. |
| 9,392,404 B2 | 7/2016 | Daoura et al. |
| 9,466,198 B2 | 10/2016 | Burch et al. |
| 9,467,862 B2 | 10/2016 | Zeiler et al. |
| 9,615,450 B2 | 4/2017 | Hwang et al. |
| 9,641,964 B2 | 5/2017 | Kulkarni et al. |
| 9,749,780 B2 | 8/2017 | Huang et al. |
| 9,756,402 B2 | 9/2017 | Stampfl et al. |
| 9,773,268 B2 | 9/2017 | Bonner et al. |
| 9,792,655 B2 | 10/2017 | Griffin et al. |
| 9,811,962 B2 | 11/2017 | Phillips et al. |
| 9,815,166 B2 | 11/2017 | Goldstein et al. |
| 9,819,132 B2 | 11/2017 | Peloquin et al. |
| 9,886,680 B2 | 2/2018 | Johnson et al. |
| 9,898,705 B2 | 2/2018 | Kahle et al. |
| 9,898,884 B1 | 2/2018 | Arora et al. |

(56) References Cited

U.S. PATENT DOCUMENTS

| | | |
|---|---|---|
| 9,909,760 B2 | 3/2018 | Chen et al. |
| 9,928,055 B1 | 3/2018 | Douberley et al. |
| 9,934,545 B2 | 4/2018 | Kropp |
| 10,152,688 B2 | 12/2018 | DeBusk et al. |
| 2001/0052416 A1 | 12/2001 | Wissmach et al. |
| 2002/0033267 A1 | 3/2002 | Schweizer et al. |
| 2002/0153418 A1 | 10/2002 | Maloney |
| 2004/0040727 A1 | 3/2004 | Miller |
| 2005/0035659 A1 | 2/2005 | Hahn et al. |
| 2005/0110639 A1 | 5/2005 | Puzio et al. |
| 2006/0009879 A1 | 1/2006 | Lynch et al. |
| 2006/0076385 A1 | 4/2006 | Etter et al. |
| 2007/0252675 A1 | 11/2007 | Lamar |
| 2008/0001755 A1 | 1/2008 | Puzio et al. |
| 2008/0084334 A1 | 4/2008 | Ballew |
| 2008/0086320 A1 | 4/2008 | Ballew et al. |
| 2008/0086323 A1 | 4/2008 | Petrie et al. |
| 2008/0086349 A1 | 4/2008 | Petrie et al. |
| 2008/0086427 A1 | 4/2008 | Wallace |
| 2008/0086428 A1 | 4/2008 | Wallace |
| 2008/0086685 A1 | 4/2008 | Janky et al. |
| 2009/0250364 A1 | 10/2009 | Gerold et al. |
| 2009/0251330 A1 | 10/2009 | Gerold et al. |
| 2009/0267769 A1 | 10/2009 | Stevens |
| 2009/0273436 A1 | 11/2009 | Gluck et al. |
| 2010/0096151 A1 | 4/2010 | Östling |
| 2010/0116519 A1 | 5/2010 | Gareis |
| 2010/0154599 A1 | 6/2010 | Gareis |
| 2010/0181964 A1 | 7/2010 | Kadous et al. |
| 2011/0056716 A1 | 3/2011 | Jönsson et al. |
| 2011/0067895 A1 | 3/2011 | Nobe et al. |
| 2011/0162858 A1 | 7/2011 | Coste |
| 2011/0302051 A1 | 12/2011 | Arbatli |
| 2011/0309931 A1 | 12/2011 | Rose |
| 2012/0111589 A1 | 5/2012 | Schmidt et al. |
| 2012/0167721 A1 | 7/2012 | Fluhrer |
| 2012/0292070 A1 | 11/2012 | Ito et al. |
| 2013/0035978 A1 | 2/2013 | Richardson et al. |
| 2013/0109375 A1 | 5/2013 | Zeiler et al. |
| 2013/0126202 A1 | 5/2013 | Oomori et al. |
| 2013/0133907 A1 | 5/2013 | Chen et al. |
| 2013/0138465 A1 | 5/2013 | Kahle et al. |
| 2013/0138606 A1 | 5/2013 | Kahle et al. |
| 2013/0153250 A1 | 6/2013 | Eckert |
| 2013/0187587 A1 | 7/2013 | Knight et al. |
| 2013/0191417 A1 | 7/2013 | Petrie et al. |
| 2013/0204753 A1 | 8/2013 | Wallace |
| 2013/0255980 A1 | 10/2013 | Linehan et al. |
| 2013/0304545 A1 | 11/2013 | Ballew et al. |
| 2014/0006295 A1 | 1/2014 | Zeiler et al. |
| 2014/0069672 A1 | 3/2014 | Mashiko et al. |
| 2014/0070924 A1 | 3/2014 | Wenger et al. |
| 2014/0107853 A1 | 4/2014 | Ashinghurst et al. |
| 2014/0122143 A1 | 5/2014 | Fletcher et al. |
| 2014/0149416 A1 | 5/2014 | Wallace |
| 2014/0151079 A1 | 6/2014 | Furui et al. |
| 2014/0158389 A1 | 6/2014 | Ito et al. |
| 2014/0159662 A1 | 6/2014 | Furui et al. |
| 2014/0159919 A1 | 6/2014 | Furui et al. |
| 2014/0159920 A1 | 6/2014 | Furui et al. |
| 2014/0184397 A1 | 7/2014 | Volpert |
| 2014/0292245 A1 | 10/2014 | Suzuki et al. |
| 2014/0316837 A1 | 10/2014 | Fosburgh et al. |
| 2014/0324194 A1 | 10/2014 | Larsson et al. |
| 2014/0331830 A1 | 11/2014 | King et al. |
| 2014/0334270 A1 | 11/2014 | Kusakawa |
| 2014/0336810 A1 | 11/2014 | Li et al. |
| 2014/0336955 A1 | 11/2014 | Li et al. |
| 2014/0350716 A1 | 11/2014 | Fly et al. |
| 2014/0365259 A1 | 12/2014 | Delplace et al. |
| 2014/0367134 A1 | 12/2014 | Phillips et al. |
| 2014/0379136 A1 | 12/2014 | Schlegel et al. |
| 2015/0000944 A1 | 1/2015 | Duesselberg et al. |
| 2015/0002089 A1 | 1/2015 | Rejman et al. |
| 2015/0042247 A1 | 2/2015 | Kusakawa |
| 2015/0084745 A1 | 3/2015 | Hertz et al. |
| 2015/0097674 A1 | 4/2015 | Mondal et al. |
| 2015/0135306 A1 | 5/2015 | Winkler et al. |
| 2015/0162646 A1 | 6/2015 | Kawase et al. |
| 2015/0179036 A1 | 6/2015 | Heine et al. |
| 2015/0340921 A1 | 11/2015 | Suda et al. |
| 2015/0356858 A1* | 12/2015 | Daoura .................. G06Q 10/00 340/539.32 |
| 2016/0071340 A1 | 3/2016 | Kauth |
| 2016/0088482 A1* | 3/2016 | Zeiler .................. H04W 4/029 455/426.1 |
| 2016/0364687 A1 | 12/2016 | Matson et al. |
| 2017/0008159 A1 | 1/2017 | Boeck et al. |
| 2017/0201295 A1 | 7/2017 | Kusakawa |
| 2018/0190103 A1 | 7/2018 | Daoura et al. |

FOREIGN PATENT DOCUMENTS

| | | |
|---|---|---|
| DE | 10029138 | 1/2002 |
| DE | 10309703 | 9/2004 |
| DE | 202006014606 | 1/2007 |
| EP | 1533767 | 1/2001 |
| EP | 2147750 | 1/2010 |
| WO | WO97023986 | 7/1997 |
| WO | WO02030624 | 4/2002 |
| WO | WO2007090258 | 8/2007 |
| WO | WO2009013045 | 1/2009 |
| WO | WO2013116303 | 8/2013 |

OTHER PUBLICATIONS

International Search Report and Written Opinion for Application No. PCT/2017/036128 dated Sep. 12, 2017.
ASAP Systems "Barcloud Inventory Management & Asset Tracking Software" 2015, downloaded Jul. 13, 2015, (23 pages).
Gigatrak, <http://www.gigatrak.com/>, 2010 (3 pages).
International Search Report and Written Opinion for Application No. PCT/IB2016/000987 dated Dec. 9, 2016, 14 pages.
ToolWatch, "ToolWatch Enterprise", 2006 (8 pages).
Trimble Alltrak, "Take Control of your Assets", 2009, downloaded Jul. 13, 2015 (4 pages).

* cited by examiner

SYSTEM AND METHOD FOR ESTABLISHING A WIRELESS CONNECTION BETWEEN POWER TOOL AND MOBILE DEVICE

RELATED APPLICATIONS

This application is a continuation application of U.S. patent application Ser. No. 15/615,214, filed on Jun. 6, 2017, which claims priority to U.S. Provisional Patent Application No. 62/346,421, filed on Jun. 6, 2016, the entire contents of each of which are hereby incorporated by reference.

FIELD OF THE INVENTION

This application relates to power tools that communicate wirelessly with a mobile device.

SUMMARY

In one embodiment, a method is provided for connecting a power tool device with a mobile device. The method includes receiving, at a user interface of the mobile device, a request to connect to the power tool device. A transceiver of the mobile device then transmits a short-range advertisement. The method further includes receiving a signal from the power tool device in response to the short-range advertisement and determining, using an electronic processor of the mobile device, a signal strength of the signal. The electronic processor further determines that the signal strength is above a signal strength threshold and establishes a connection with the power tool device in response to determining that the signal strength is above the signal strength threshold.

In another embodiment, a mobile device is provided for connecting with a power tool device. The mobile device includes a transceiver, a memory, and an electronic processor coupled to the transceiver and memory. The electronic processor is configured to receive, via a user interface of the mobile device, a request to connect to the power tool device and to transmit, with the transceiver, a short-range advertisement. The electronic processor further receives, via the transceiver, a signal from the power tool device in response to the short-range advertisement, and determines a signal strength of the signal. The electronic processor determines that the signal strength is above a signal strength threshold, and establishes a connection with the power tool device in response to determining that the signal strength is above the signal strength threshold.

In another embodiment, a method is provided for connecting a power tool device with a mobile device. The method includes receiving, at a user interface of the mobile device, a request to connect to the power tool device. The method further includes transmitting, with a transceiver of the mobile device, a short-range advertisement, and receiving a signal from the power tool device in response to the short-range advertisement. In the method, an electronic processor of the mobile device determines a signal strength of the signal and determines that the signal strength is above a signal strength threshold. In response to determining that the signal strength is above the signal strength threshold, the electronic processor adds the power tool device to a power tool device inventory of a user.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
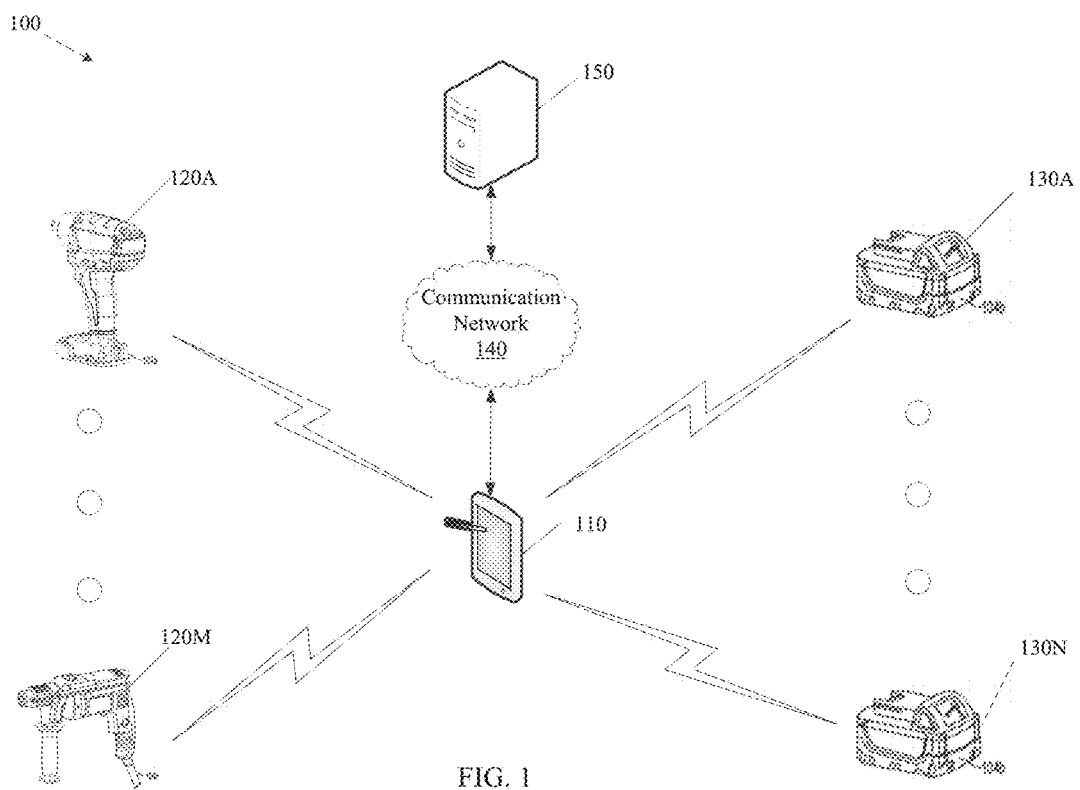
FIG. 1 is a diagram of a system for establishing a wireless connection in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method for connecting a power tool with a mobile device. The method includes the mobile device receiving a user request to connect to the power tool and transmitting a short-range advertisement. The power tool receives the short-range advertisement and transmits a signal. The mobile device receives the signal and determines a signal strength. The mobile device compares the signal strength to a predetermined signal strength value. When the signal strength exceeds the predetermined signal strength value (e.g., indicating that the mobile device 110 has tapped the power tool 120 or that the mobile device 110 was brought in close proximity of the power tool 120), the mobile device performs one or more of connecting with the power tool, adding the power tool to a power tool inventory of a user, sending the power tool a configuration profile to configure the power tool, and sending security settings to the power tool.

Another embodiment provides a mobile device for connecting with a power tool. The mobile device includes an electronic processor coupled to a memory. The electronic processor is configured to receive, via a user interface of the mobile device, a request to connect to a power tool and transmit, via a short-range transceiver, a short-range advertisement. The electronic processor is further configured to receive a signal from the power tool and determine a signal strength of the signal. The electronic processor is also configured to compare the signal strength to a predetermined signal strength value. When the signal strength exceeds the predetermined signal strength value (e.g., indicating that the mobile device 110 has tapped the power tool 120 or that the mobile device 110 was brought in close proximity of the power tool 120), the electronic processor performs one or more of connecting with the power tool, adding the power tool to a power tool inventory of a user, sending the power tool a configuration profile to configure the power tool, and sending security settings to the power tool.

FIG. 1 is a diagram of a system 100 for establishing a wireless connection. In the example illustrated, the system 100 includes a mobile device 110. The mobile device 110 may be, for example, a smart telephone, a tablet computer, a laptop computer and the like. The mobile device 110 communicates with a plurality of power tools 120A through 120M and a plurality of battery packs 130A through 130N. On a singular basis, one of the power tools 120A through 120M may be referred to herein as a power tool 120. Similarly, on a singular basis, one of the battery packs 130A through 130N may be referred to herein as a battery pack 130. The power tool 120 may be, for example, a drill/driver, a hammer drill, an impact driver, a jigsaw, a reciprocating saw, and the like. The battery pack 130 may be, for example, a 12 V or 18 V battery pack used to power the power tools 120A through 120M.

The mobile device 110 communicates over a communication network 140 with a server 150. The communication network 140 may be a wired or wireless communication network, for example, the Internet, a cellular network, and the like. The server 150 may be, for example, a manufacturer's server, a company's personal server listing the tools owned by the company, and the like. FIG. 1 illustrates only one example embodiment of the system 100. In other embodiments, the system 100 may include more or fewer components and may perform functions that are not explicitly described herein.

Figure 2:
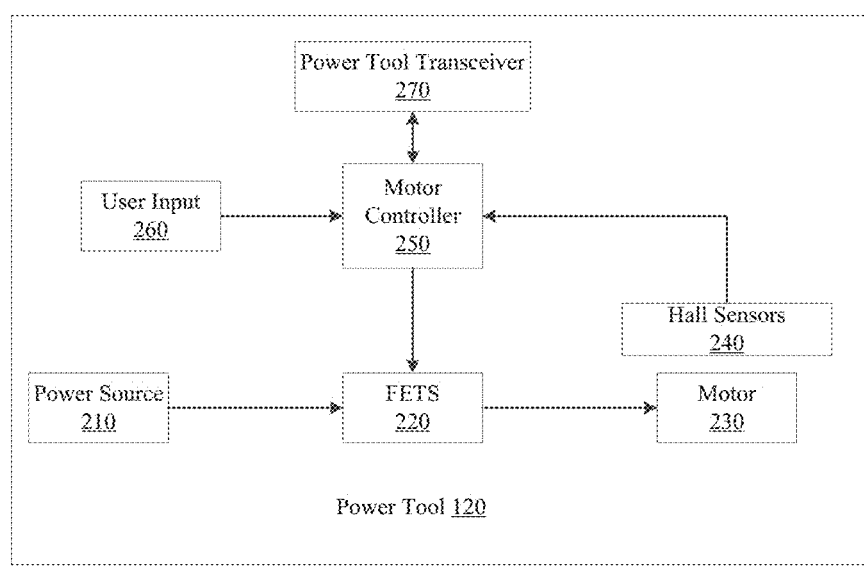
FIG. 2 is a diagram of a power tool in accordance with some embodiments.

FIG. 2 is a diagram of one embodiment of the power tool 120. In the example illustrated, the power tool 120 includes a power source 210, Field Effect Transistors (FETs) 220, a motor 230, Hall sensors 240, a motor controller 250, user input 260, and a power tool transceiver 270. The power source 210 provides direct-current (DC) power to various components of the power tool 120 and may be a power tool battery pack, for example, battery pack 130. In some embodiments, the power source 210 may receive AC power from a tool plug that is coupled to a standard wall outlet, and then filter, condition, and rectify the received power to output DC power to the components of the power tool 120.

Each Hall sensor 240 outputs motor feedback information, such as an indication when a magnet of the rotor rotates across the face of that Hall sensor 240. Based on the motor feedback information from the Hall sensors 240, the motor controller 250 can determine the position, velocity, and acceleration of the rotor. The motor controller 250 also receives user controls from the user input 260, such as by depressing a trigger or shifting a forward/reverse selector. In response to the motor feedback information and user controls, the motor controller 250 transmits control signals to control the FETs 220 to drive the motor 230. By selectively enabling and disabling the FETs 220, power from the power source 210 is selectively applied to stator coils of the motor 230 to cause rotation of a rotor. Although not shown, the motor controller 250 and other components of the power tool 120 are electrically coupled to the power source 210 such that the power source 210 provides power thereto.

The power tool transceiver 270 is electrically coupled to the motor controller 250. In some embodiments, the power tool transceiver 270 may be a part of the motor controller 250. The motor controller 250 communicates with the mobile device 110 via the power tool transceiver 270. The communications may be used for various purposes. For Example, the motor controller 250 may receive profile information for the power tool 120 from the power tool transceiver 270. In response to the profile information, the motor controller 250 may set limits of the power tool 120 and transmit control signals to control the FETs 220 to drive the motor 230. Additionally, the motor controller 250 may provide identifying information of the power tools 120 to the mobile device 110 via the power tool transceiver 270. Other applications of the communications via the power tool transceiver 270 are discussed in further detail below. FIG. 2 illustrates only one example embodiment of a power tool 120. The power tool 120 may include more or fewer components and may perform functions other than those explicitly described herein.

Figure 3:
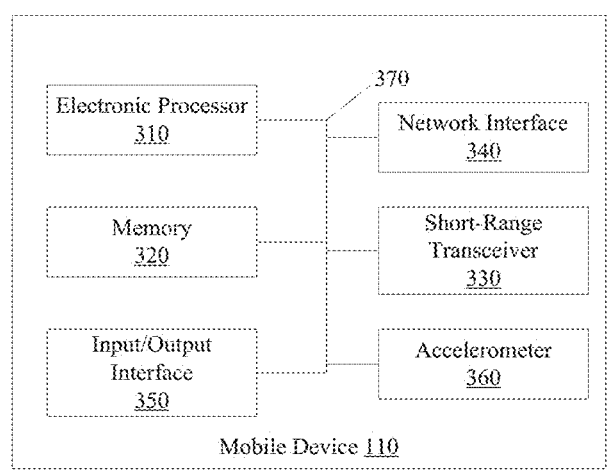
FIG. 3 is a diagram of a mobile device in accordance with some embodiments.

FIG. 3 is a diagram of one embodiment of the mobile device 110. In the example illustrated, the mobile device 110 includes an electronic processor 310, a memory 320, a short-range transceiver 330, a network interface 340, an input/output interface 350, and an accelerometer 360. The electronic processor 310, the memory 320, the short-range transceiver 330, the network interface 340, the input/output interface 350, and the accelerometer 360 communicate over one or more control and/or data buses, for example, a communication bus 370. FIG. 3 illustrates only one example embodiment of a mobile device 110. The mobile device 110 may include more or fewer components and may perform functions other than those explicitly described herein.

In some embodiments, the electronic processor 310 is implemented as a microprocessor with separate memory, such as the memory 320. In other embodiments, the electronic processor 310 may be implemented as a microcontroller (with memory 320 on the same chip). In other embodiments, the electronic processor 310 may be implemented using multiple processors. In addition, the electronic processor 310 may be implemented partially or entirely as, for example, a field programmable gate array (FPGA), an application specific integrated circuit (ASIC), and the like, and the memory 320 may not be needed or may be modified accordingly. In the example illustrated, the memory 320 includes non-transitory, computer-readable memory that stores instructions that are received and executed by the electronic processor 310 to carry out functionality of the mobile device 110 described herein. The memory 320 may include, for example, a program storage area and a data storage area. The program storage area and the data storage area may include combinations of different types of memory, such as a read-only memory and random-access memory.

The short-range transceiver 330 enables wireless communication from the mobile device 110 to, for example, the power tools 120A through 120M and the battery packs 130A through 130N. The network interface 340 enables wired or wireless communication from the mobile device 110 to, for example, the server 150. In some embodiments, rather than including the short-range transceiver 330 and the network interface 340, the mobile device 110 may include a single transceiver to perform functions of both the short-range transceiver 330 and the network interface 340. In some embodiments, the short-range transceiver 330 may include separate transmitting and receiving components, for example, a transmitter, and a receiver that perform the functions of the short-range transceiver 330 and/or the network interface 340.

The input/output interface 350 may include one or more input mechanisms (for example, a touch screen, a keypad, and the like), one or more output mechanisms (for example, a display, a speaker, and the like), or a combination thereof. The input/output interface 350 receives input from a user, provides output to a user, or a combination thereof The accelerometer 360 measures acceleration forces and/or orientation of the mobile device 110. The accelerometer 360 outputs acceleration, g-force, or orientation information of the mobile device 110 to the electronic processor 310 over the communication bus 370.

Figure 4:
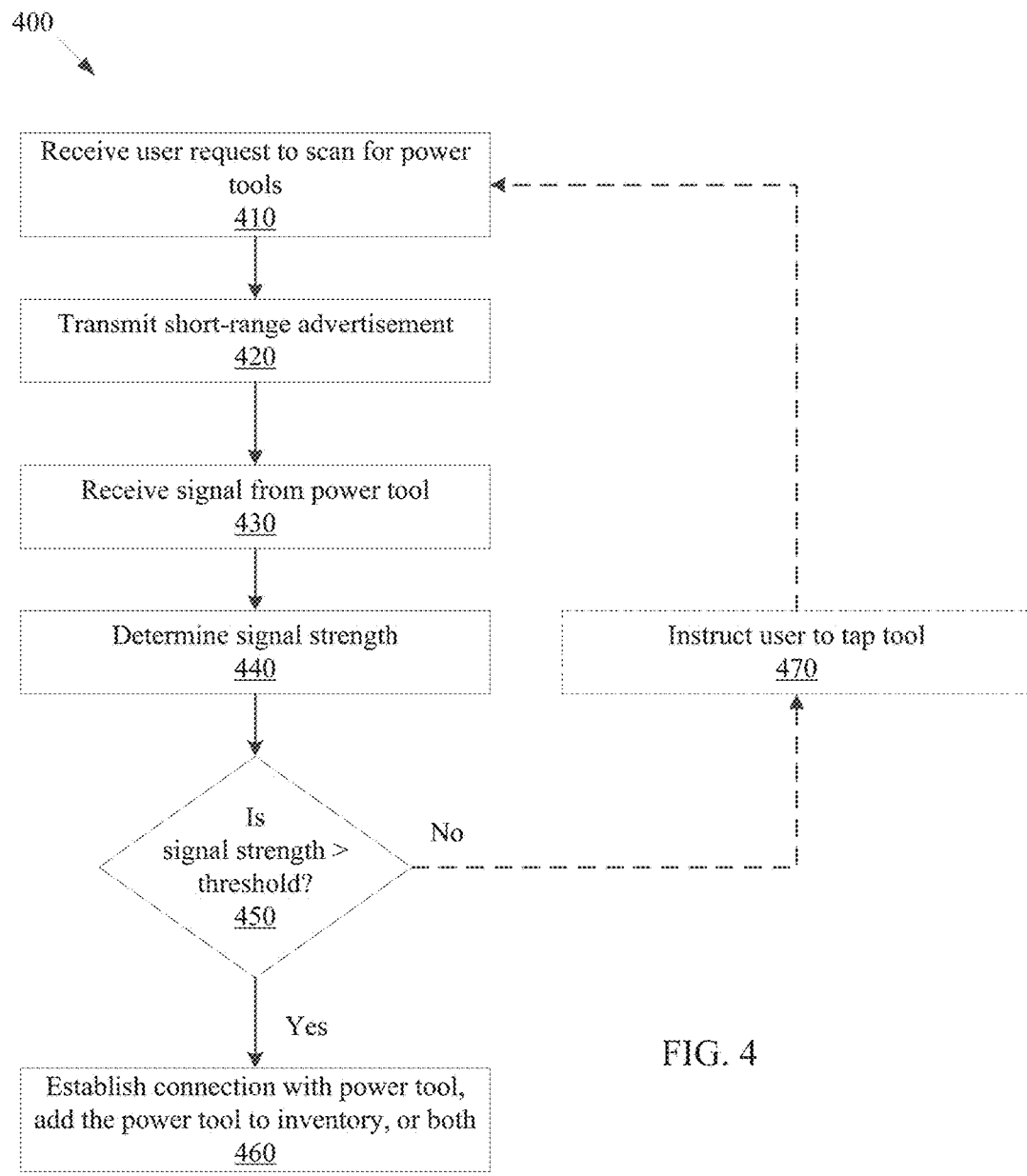
FIG. 4 is a flowchart of a method of establishing a wireless connection between a power tool and a mobile device in accordance with some embodiments.

FIG. 4 is a flowchart of one embodiment of a method 400 for establishing a wireless connection. In the example illustrated, method 400 includes receiving a user request to scan for nearby power tools 120 (e.g., the power tools 120A through 120M that are within wireless communication range) (at step 410). The mobile device 110 may receive a user request to scan for power tools 120 via the input/output interface 350 of the mobile device 110. For example, the user may select a scan option on a touch screen of the mobile device 110.

At step 420, the mobile device 110 transmits a short-range advertisement. For example, the mobile device 110 transmits a Bluetooth® advertisement via the short-range transceiver 330. The mobile device 110 may transmit the short-range advertisement for a predetermined period of time after the mobile device 110 receives the user request at step 410. For example, the mobile device 110 may transmit the short-range advertisement for 5 seconds, 10 seconds, 15 seconds, or more after receiving the user request. The short-range advertisement may be transmitted a pre-determined number of times per second. For example, the mobile device 110 may transmit the short-range advertisement 10 or more times per second during the 15 second period.

At step 430, the mobile device 110 receives a signal from the power tool 120. The power tool 120 is configured to transmit the signal via the power tool transceiver 270. For example, the power tool 120 transmits a Bluetooth® signal. In some embodiments, the power tool 120 transmits the signal in response to receiving the short-range advertisement from the mobile device 110. In other embodiments, the power tool 120 transmits the signal in response to a user pressing a button on the power tool 120. In these embodiments, the mobile device 110 may receive the signal from the power tool 120 without the need for transmitting a short-range advertisement. That is, the mobile device 110 may listen for and receive a signal from the power tool 120 after receiving a request to scan for nearby tools without transmitting a short-range advertisement. The signal may include one or more of a tool identifier, a tool type, a transceiver type, a transceiver power level, and other information. In some embodiments, the mobile device 110 may not receive a signal from the power tool 120. In these embodiments, the mobile device 110 may notify the user via a graphical user interface that no signal was received from the power tool 120.

At step 440, the electronic processor 310 determines the signal strength of the signal received from the power tool 120 at step 430. For example, the electronic processor 310 may detect, store, and output a received signal strength indication (RSSI) based on the received signal from the power tool 120. The detection of signal strength may be based on, for example, the amplitude of the incoming signal.

At step 450, the electronic processor 310 of the mobile device 110 compares the signal strength to a predetermined threshold. The electronic processor 310 may compare the received signal strength indication (RSSI) to the predetermined threshold. The predetermined threshold may be set based on the distance at which the mobile device 110 is desired to connect with the power tool 120. For example, the predetermined threshold may be set such that the mobile device 110 is within about 1-10 centimeters (e.g., close proximity of the tool) before the signal strength exceeds the predetermined threshold, or such that the mobile device 110 is in physical contact with the power tool 120 (e.g., tapping the tool). However, the predetermined threshold may be changed to increase or decrease the distance at which the mobile device 110 initiates a connection with the power tool 120. For example, the mobile device 110 may alter the predetermined threshold based on user input to the mobile device 110 via a graphical user interface on the mobile device 110.

In some embodiments, the electronic processor 310 of the mobile device 110 may use sensor information in addition to the signal strength to determine whether the mobile device 110 is within close proximity of the power tool 120. For example, the electronic processor 310 may receive an output from the accelerometer 360 that indicates that the mobile device 110 was moved. The electronic processor 310 may also detect that during the movement of the mobile device 110, the signal strength received from the power tool 120 increased. Based on this detection, the electronic processor 310 may determine that the mobile device 110 was tapped with the power tool 120 or brought in close proximity of the power tool 120. In other embodiments, different combination of inputs from sensors and the received signal strength may be used to determine whether the mobile device 110 was tapped with the power tool 120 or was brought in close proximity of the power tool 120. For example, the electronic processor 310 may receive an output from the accelerometer 360 that indicates that the mobile device 110 was moving and stopped moving or changed directions, which in combination with the signal strength above threshold, may indicate that the mobile device 110 tapped the power tool 120 or was momentarily brought into close proximity with the power tool 120 before being pulled back by a user.

When the signal strength exceeds the predetermined threshold, the mobile device 110 connects with the power tool 120, adds the power tool 120 to the roster/inventory of the mobile device 110, or both (at step 460). For example, the mobile device 110 initiates a Bluetooth® connection with the power tool 120. The mobile device 110 and the power tool 120 can exchange information once a connection is established (e.g., when the mobile device 110 and the power tool 120 are connected over a Bluetooth® connection). Establishing a connection may include successfully communicating signals by the mobile device 110 and the power tool 120 according to a handshake protocol, and establishing a communication channel for further communications. The mobile device 110 may further add the power tool 120 to the roster of the mobile device 110. The roster may be stored in the memory 320 or on a server (e.g., the server 150) in communication with the mobile device 110. Similarly, the mobile device 110 is added to the roster of the power tool 120 stored in a memory of the power tool 120.

Optionally, when the signal strength is determined to be below the predetermined threshold in step 450, the mobile device 110 may instruct the user to bring the mobile device 110 in close proximity of the power tool 120 (at step 470) and return to step 410 to wait for another user request to scan for nearby power tools 120. For example, the mobile device 110 may display a message via a graphical user interface instructing the user to tap the power tool 120 with the mobile device 110 or bring the mobile device 110 within close proximity (e.g., within 2-3 feet) of the power tool 120. In some embodiments, when the signal strength is below the predetermined threshold, the mobile device 110 may display a message notifying the user that no power tools 120 were found within close proximity.

In some embodiments, method 400 may be used to pair the mobile device 110 with the power tool 120. That is, when the mobile device 110 is brought close to in contact with the power tool 120, the mobile device 110 pairs with the power tool 120. The pairing process involves generating a communication link (also known as a bond) between the mobile device 110 and the power tool 120. The pairing process may be triggered by a specific request from a user to generate a bond on a graphical user interface of the mobile device 110. Subsequently, the mobile device 110 may connect with the power tool 120 whenever they are brought close together or contacted after the initial pairing operation without repeating the pairing process to confirm device identities.

In some embodiments, adding the power tool 120 to the inventory may include adding a power tool identifier of the power tool 120 to an electronic database that is associated with a user identifier, for example, of a user of the mobile device 110. In some embodiments, adding the power tool 120 to the inventory may also include identifying, for example, a user of the mobile device 110 as an owner of the power tool 120 in an electronic database.

In some embodiments, identifying the user of the mobile device 110 as an owner of the power tool 120 may include updating one or more permissions of the user with respect to the power tool 120. The mobile device 110 or the server 150 may store and maintain permissions of the user with respect to the power tool 120. For example, in conjunction with being identified as the owner, the mobile device 110 may update the permissions of the user to allow the user to adjust security settings of the power tool 120. The mobile device 110 then permits the user to adjust security settings of the power tool 120, through the mobile device 110, as described below with respect to method 900. In contrast, users that are not identified as an owner may be denied the ability to adjust security settings by the mobile device 110. As additional examples, a user identified as an owner may have permissions updated to permit the user to read tool usage data from the power tool 120 or send a configuration file to configure operating parameters of the power tool 120.

In some embodiments, identifying the user of the mobile device 110 as an owner of the power tool 120 may include allowing the user to configure permissions for other users, which indicate whether a mobile device 110 of such other users are able to configure operation parameters of the power tool 120 or configure security settings of the power tool 120. For example, when identified as the owner, a user may use the mobile device 110 to configure permissions for other users, which are maintained on the server 150. The mobile devices 110 of the other users may access the server 150 to determine permission levels with respect to power tools 120 encountered.

In some embodiments, the electronic processor 310 averages the signal strength of the last five signals received from the power tool 120 (at step 440). That is, the electronic processor 310 continuously determines the signal strength of the received signals and averages the signal strength to determine average signal strength over a period of time. The electronic processor 310 then compares the average signal strength to the predetermined threshold at step 450, and thereafter continues with the method 400 as previously described. When the average signal strength exceeds the predetermined threshold, the mobile device 110 connects with the power tool 120 and adds the power tool 120 to the roster/inventory of the mobile device 110 (at step 460). In these embodiments, the electronic processor 310 may also be configured to weight the received signal strengths when determining the averages. For example, the electronic processor 310 may weigh the most recent signal (e.g., the fifth signal) more than the initial signal (e.g., the first signal).

In other embodiments, the electronic processor 310 continuously monitors the signal strength to determine whether the signal strength is increasing. For example, the electronic processor 310 may first determine that the signal strength exceeds a predetermined threshold (step 450). The electronic processor 310 then determines whether the signal strength of signals from the power tool 120 is increasing at a predetermined rate. When the signal strength increases at or above the predetermined rate, the mobile device 110 connects with the power tool 120 and adds the power tool 120 to the roster/inventory of the mobile device 110. In these instances, the electronic processor 310 may also be configured to detect the mobile device 110 tapping the power tool 120. For example, the electronic processor 310 may be configured to detect that the signal strength is increasing at a certain rate, reached a threshold, and is decreasing at a certain rate. That is, the signal strength indicates that the mobile device 110 is tapping the power tool 120 one or more times. The electronic processor 310 connects the mobile device 110 with the power tool 120 upon detecting that the mobile device 110 tapped the power tool 120.

The signal strength of the signal from the power tool 120 may vary based on the type of the power tool transceiver 270 used in the power tool 120. In these instances, the power tool 120 may indicate the type of the power tool transceiver 270 in the signal transmitted by the power tool 120 (step 430). The mobile device 110 may then adjust the predetermined threshold used in step 450 based on the signal received from the power tool 120. In other embodiments, the mobile device 110 may automatically detect the type of power tool 120 based on the received signal (e.g., based on an encoded tool identifier). The mobile device 110 may then look up the type of power tool transceiver 270 used in the power tool 120 from the server 150, and adjust the predetermined threshold based on the determined type of power tool transceiver 270.

In some embodiments, the power tool 120 sends a value of the transmission power used with the signal that is transmitted at step 430 of FIG. 4. The mobile device 110 may use this transmission power value to set the predetermined threshold used in step 450 and determine the proximity of the power tool 120 relative to the mobile device 110.

In some embodiments, the mobile device 110 may retrieve usage data from the power tool 120 after establishing a connection with the power tool 120. The power tool 120 may record usage data in a memory of the power tool 120. The power tool 120 may record, for example, a current draw parameter indicating current drawn by the motor 230, a motor speed parameter indicating a motor speed, a vibration parameter indicating vibrations of the power tool 120, etc. The mobile device 110 may receive this usage data over the communication link established between the mobile device 110 and the power tool 120. The usage data then may be displayed on the mobile device 110 or transmitted to another device, such as the server 150.

Accordingly, various embodiments disclosed herein enable a user to employ a mobile device to quickly connect and communicate with a particular power tool, even when the particular power tool is positioned in an area with several power tools, by bringing the mobile device in close proximity to the particular power tool.

Figure 5:
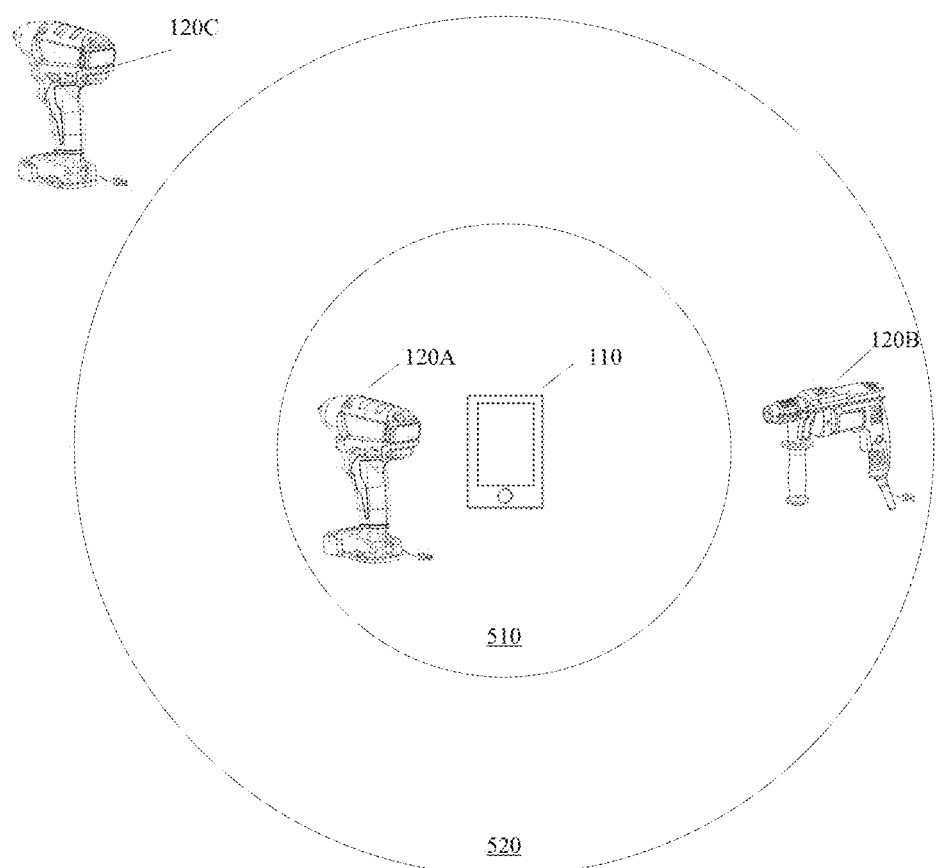
FIG. 5 illustrates an example implementation of the system from FIG. 1.

FIG. 5 illustrates an example implementation of the system 100. The predetermined threshold described with respect to step 450 of FIG. 4 may be set such that the mobile device 110 will connect with a power tool 120A that is within a first region 510. Accordingly, the mobile device 110 may ignore (e.g., not connect with) the power tools 120 outside the first region 510. The second region 520 may represent a region in which the mobile device 110 and the power tools 120 are within wireless communication range. The area outside of the second region 520 represents an area outside of wireless communication range of the short-range transceiver 330 of the mobile device 110 or the power tool transceiver 270.

Figure 6:
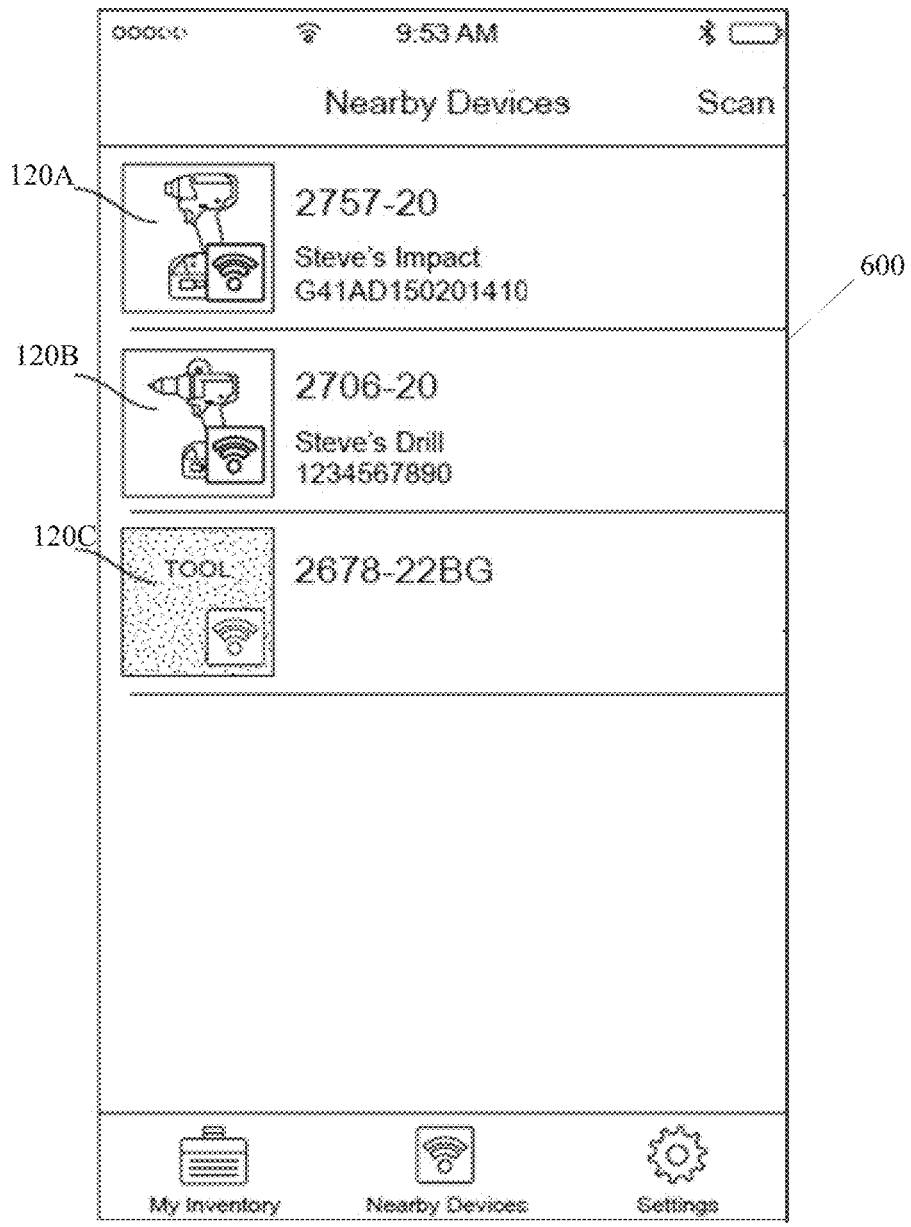
FIG. 6 illustrates a user interface of the mobile device of FIG. 3.

In some embodiments, the mobile device 110 may display, via the input/output interface 350, a list of power tools 600 listing the power tools 120 that are near (i.e., within communication range of) the mobile device 110, as shown in FIG. 6. The mobile device 110 may display the power tools 120 in the order of the signal strength received from the power tools 120. For example, based on the positioning in the diagram of FIG. 5, the mobile device 110 would likely determine that the power tool 120A has a higher signal strength than the power tool 120B because the power tool 120A is within the first region 510 that is closer to the mobile device 110. Accordingly, the mobile device 110 may show the power tool 120A that is within the first region 510 at the top of the power tool list on a user interface of the mobile device 110 and show the power tool 120B that is within the second region 520 second in the power tool list. The mobile device 110 may show the power tool 120C that is outside both the first region 510 and the second region 520 as unavailable to connect near the bottom of the power tool list on the user interface of the mobile device 110, or may not show the power tool 120C on the power tool list.

Figure 7:
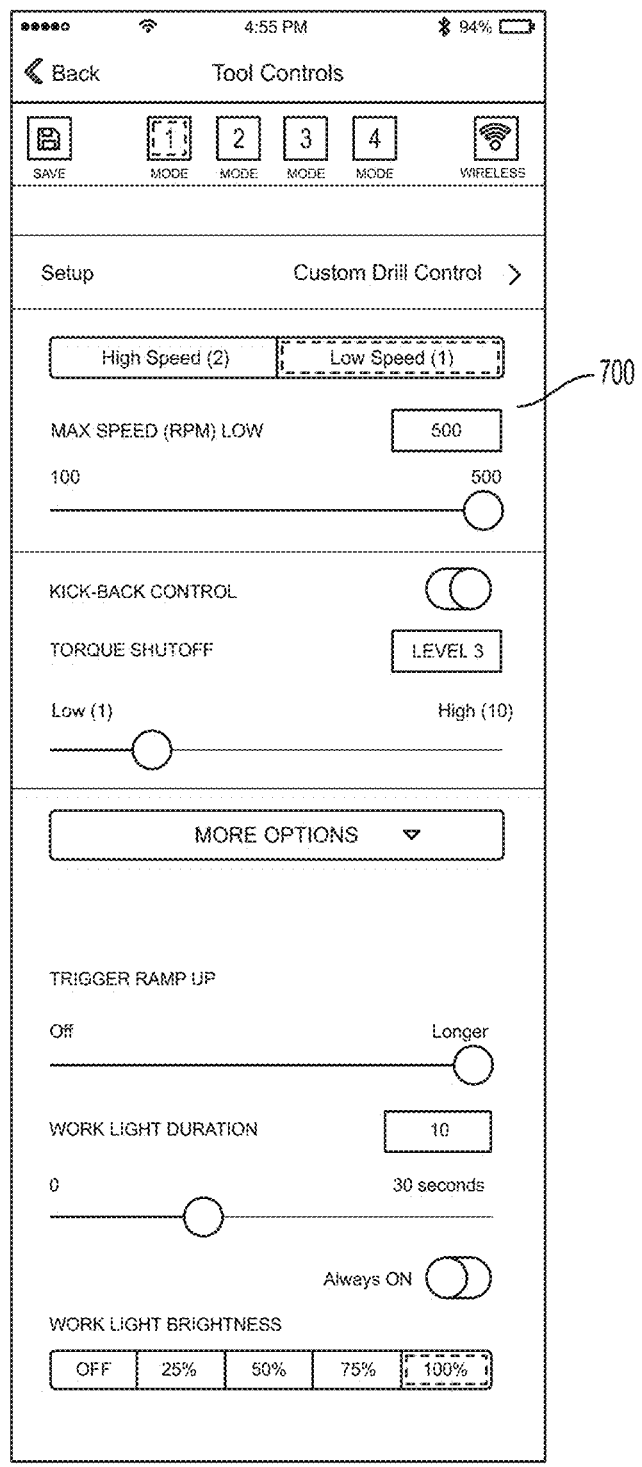
FIG. 7 illustrates a user interface of the mobile device of FIG. 3.

In some embodiments, the above described features may be used to apply a configuration profile to the power tool 120. A user of the power tools 120A through 120M may configure a profile of a power tool 120 on the mobile device 110. The configuration profile includes, for example, various settings or parameters that configure the power tool 120. A graphic user interface (GUI) 700 is generated on the mobile device 110 to enable the mobile device 110 to receive user input that configures the profile (as shown in FIG. 7). The user may then tap power tool 120 with the mobile device 110 or bring the mobile device 110 in close proximity with the power tool 120 to apply the profile to the power tool 120.

Figure 8:
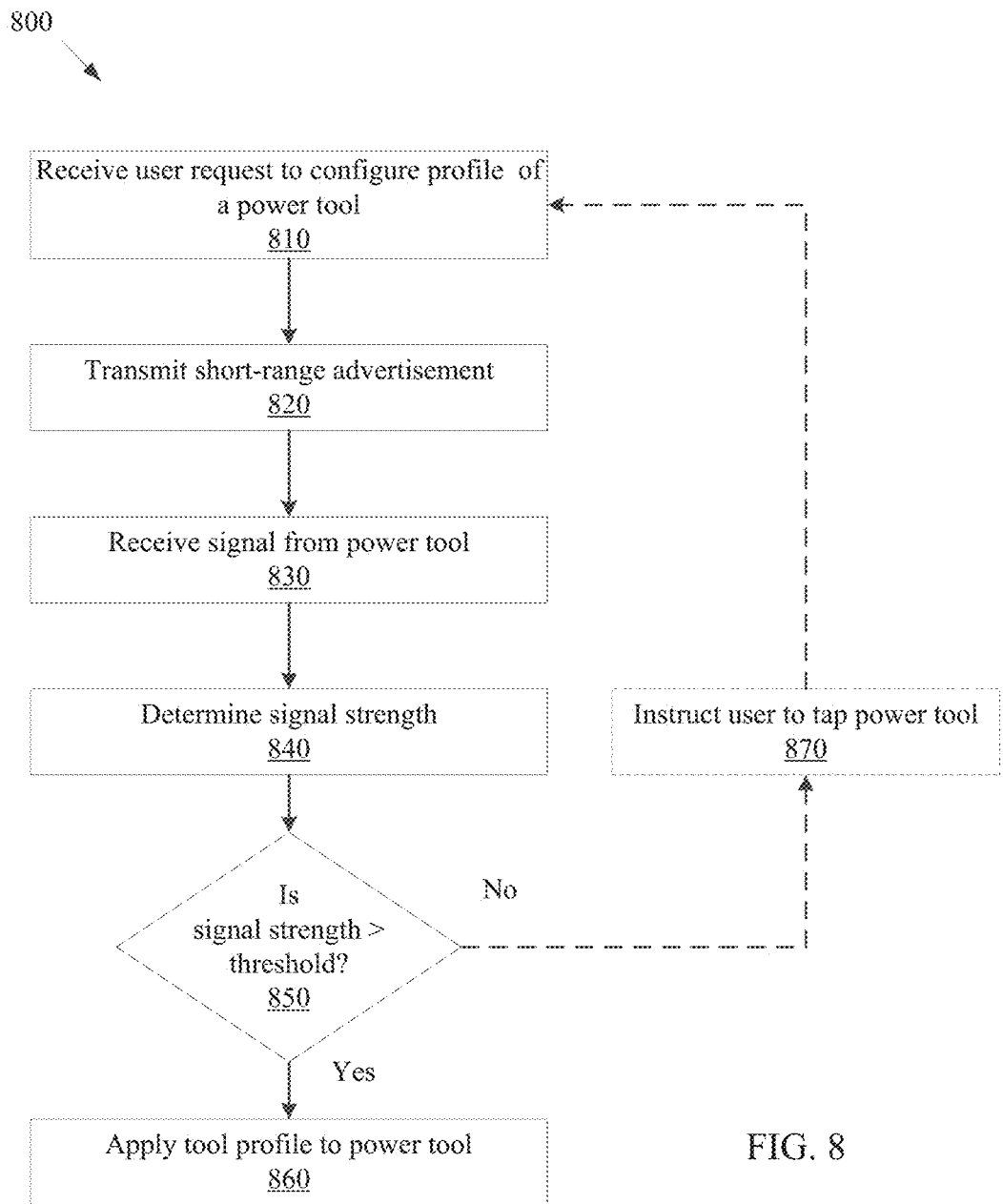
FIG. 8 is a flowchart of a method of configuring profile of the power tool of FIG. 2 using the mobile device of FIG. 3.

FIG. 8 is a flowchart of one embodiment of a method 800 for configuring a profile of the power tool 120 with the mobile device 110. In the example illustrated, method 800 includes receiving a user request to configure a profile of a power tool 120 (at step 810). The mobile device 110 may receive a user request to configure the profile of the power tool 120 via the input/output interface 350 of the mobile device 110. For example, the user may select a configure profile option on a touch screen of the mobile device 110. Based on the user input, the mobile device 110 generates a configuration profile for the power tool 120.

At step 820, the mobile device 110 transmits a short-range advertisement, for example, via the short-range transceiver 330. At step 830, the mobile device 110 receives a signal from the power tool 120. As described above with respect to step 430 of FIG. 4, when the mobile device 110 does not receive a signal from the power tool 120, the mobile device 110 may notify the user via a graphical user interface that no signal was received from the power tool 120. At step 840, the mobile device 110 determines a signal strength of the signal received from the power tool 120, for example, a received signal strength indication. At step 850, the mobile device 110 compares the signal strength to a predetermined threshold. In some embodiments, the predetermined threshold is set at a level that, when exceeded, indicates that the mobile device 110 is tapping or in close proximity of the power tool 120 (e.g., within 1-10 centimeters). The predetermined threshold may be higher (indicated a greater distance), in other embodiments.

When the signal strength exceeds the predetermined threshold (i.e., when the user taps the power tool 120 with the mobile device 110 or brings the mobile device 110 in close proximity of the power tool 120), the mobile device 110 transmits the profile information to the power tool 120 (at step 860). That is, the mobile device 110 in addition to establishing a connection with the power tool 120, transfers the configuration profile to the motor controller 250 via the power tool transceiver 270 in response to determining that the signal strength exceeds the predetermined threshold. The motor controller 250 may then apply the configuration profile. For example, the configuration profile may include one or more tool control parameters, such as motor speed, motor acceleration, motor cut-off thresholds (e.g., a current level at which the motor 230 stops a driving operation), and the like. The configuration profile, upon receipt, may be stored in the motor controller 250. The motor controller 250 may then, in response to the user input 260 (e.g., a trigger pull), access the configuration profile and drive the motor 230 according to the one or more tool control parameters.

Optionally, when the signal strength is below the predetermined threshold as determined in step 850, the mobile device 110 instructs the user to bring the mobile device 110 in close proximity with the power tool 120 as described above with respect of step 470 of FIG. 4 (at step 870). The method 800 then returns to step 810 to wait to receive another user request to configure the profile of a power tool 120.

In some embodiments, the mobile device 110 may be tapped against or brought in close proximity to multiple power tools 120, one at a time, to quickly configure the power tools 120. For example, the method 800, particularly steps 820, 830, 840, 850, and 860 may be repeated as the mobile device 110 is tapped against or brought in close proximity to each of the power tools 120 to be configured. Each time the mobile device 110 determines that the signal strength of one of the power tools 120 exceeds the threshold (e.g., each time the mobile device 110 is tapped against one of the power tools 120 or brought in close proximity of the power tools 120), the mobile device 110 transmits the configuration profile to configure the power tool 120.

In some embodiments, the power tools 120A through 120M may include security features that limit operation. For example, the power tool 120 may be configured to operate only when the owner (that is, the owner of the power tool 120 and the mobile device 110) enables operation of the power tool 120. In these instances, the above described features may be used to enable the operation of the power tool 120. That is, the owner of the power tool 120 may enable and disable the operation of the power tool 120 by tapping the power tool 120 with the mobile device 110 or bringing the mobile device 110 in close proximity of the power tool 120. For example, with reference to FIG. 8, in place of step 810, the mobile device 110 may receive user input indicating a desire to toggle the enable/disable state of the power tool 120. Then, in response to the mobile device 110 tapping the power tool 120 or being in close proximity of the power tool 120 (as determined in step 850), the power tool 120 has a state toggled from enabled to disabled, or vice versa, depending on the current state. That is, one or more security settings specified by the user are sent to the power tool 120 and the power tool 120 updates its security settings in response. In some embodiments, based on user input (e.g., in modified step 810), the mobile device 110 may specify a time period (e.g., 30 minutes, 1 hour, 1 day, 1 week, or 1 month) in which the power tool 120 is to remain enabled after being tapped or brought in close proximity of the mobile device 110.

In some embodiments, the above described features may be used for sharing security settings with multiple power tools 120 similar to the method 800 described above with respect to sharing a configuration profile to configure multiple power tools 120. The user may configure security settings on the mobile device 110. The security settings may include, for example, one or more of an enable command, a disable command, an enable for a set time period command, and an enable viewing or configuration by another user command. The user may then share these security settings with the power tool 120A through 120M by tapping the power tools 120A through 120M with the mobile device 110 or bringing the mobile device 110 in close proximity of the power tools 120A through 120M.

In some embodiments, the above described features may be used for inventory check-in/out of a tool crib. A user may own several power tools 120 (for example, the power tools 120A through 120M) that the user stores in a crib (for example, in a garage, tool shed, or truck). The user may use the features described above (e.g., with respect to FIG. 8) to check in and check-out a power tool 120 from the tool crib. The mobile device 110 keeps track of the power tools 120 that are checked out and the power tools 120 still remaining at the tool crib. This allows the user to keep track of all the tools that the user owns. For example, a server (e.g., the server 150) in communication with the mobile device 110 or the memory 320 may store a list of power tools 120 of the user and, for each tool, a tool crib indication that indicates whether the tool is in the tool crib (i.e., checked in or checked out). A graphical user interface is displayed on the mobile device 110, and the graphical user interface shows a list of the tools of the user and their respective tool crib status (i.e., checked in or checked out) based on the stored indication for each tool. The mobile device 110, when in a tool crib mode and tapped against or brought in close proximity with one of the power tools 120, may toggle the tool crib indication for that power tool 120 between a checked in and checked out state (or vice versa, depending on the state at the time of the tap). Detecting whether the mobile device 110 has tapped one of the power tools 120 or brought in close proximity with one of the power tools 120 may be performed using similar techniques as described above with respect to methods 400 and 800.

In some embodiments, a user may utilize the above described features to lend tools. The power tool 120 may include security features to limit operation (as described above) and visibility by mobile devices 110 of users not associated with the power tool 120. The user may put the power tool 120 in a lend mode by selecting a lend mode on a user interface of the mobile device 110 and tapping the power tool 120 or bringing the mobile device 110 in close proximity of the power tool 120 to put the power tool 120 in the lend mode (using similar techniques as described above with respect to methods 400 and 800). When not in the lend mode, a second user with a second mobile device 110 (similar to the mobile device 110) may not be permitted (e.g., by software on the second mobile device 110 or encryption by the power tool 120) to connect with the power tool 120 for enabling the power tool 120 or configuring the power tool 120 in the various ways described above. However, in the lend mode, the user may lend the power tool 120 to a second user, who may then enable and disable the power tool 120 and configure the power tool 120 using the second user's mobile device 110. The mobile device 110, based on user input, may specify a time period that the power tool 120 remains in the lend mode before reverting to a disabled mode.

In some embodiments, the above described features may be used to check for proximate tools. For example, the mobile device 110 enables a user to check that all or a subset of the power tools 120A through 120M (e.g., owned by or the responsibility of the user) are proximate to the mobile device 110 at the start of a workday or task, end of a workday or task, and other times.

Figure 9:
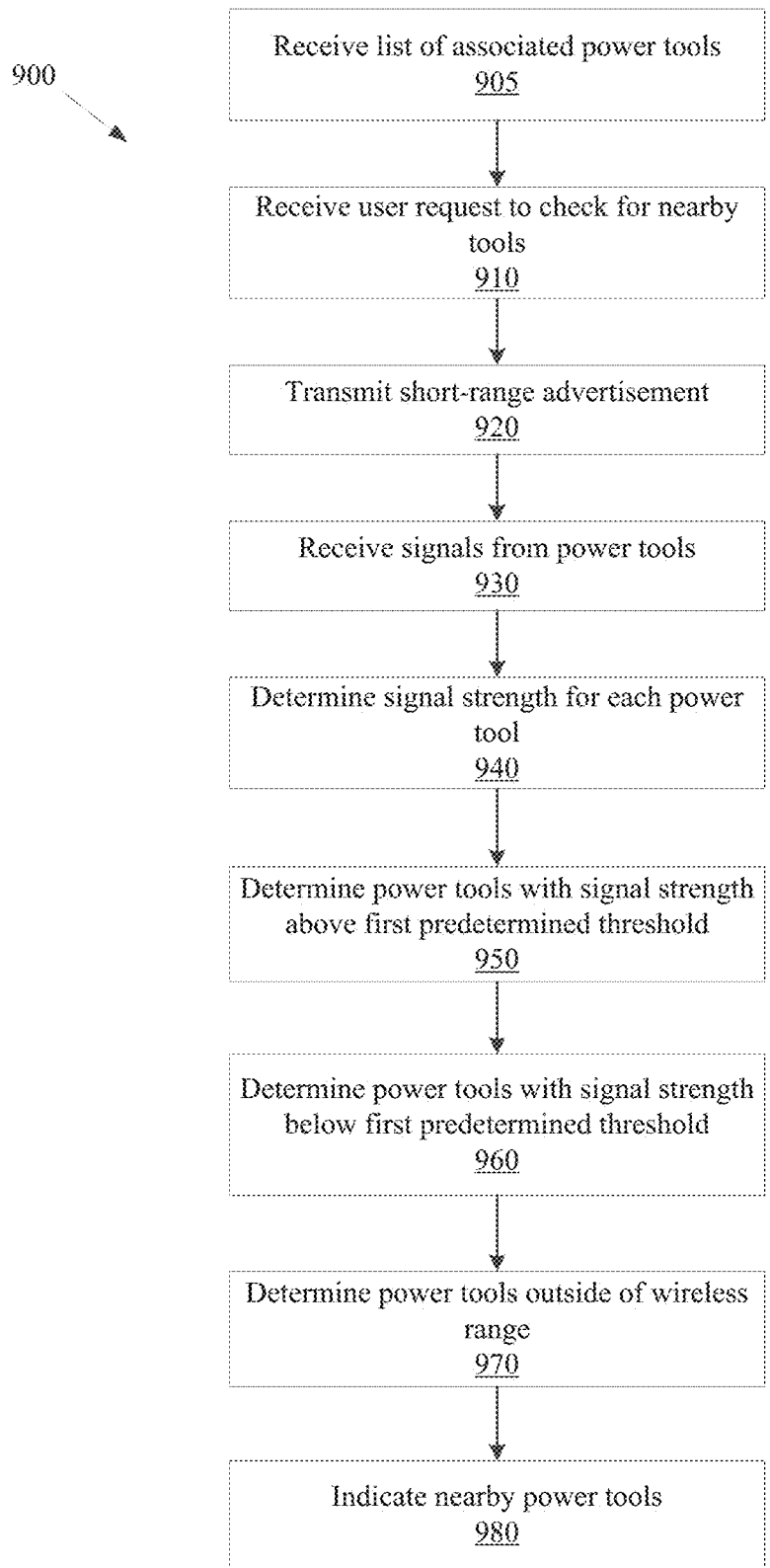
FIG. 9 is a flowchart of a method of checking for proximate tools using the mobile device of FIG. 3.

FIG. 9 is one embodiment of a method 900 to check for proximate tools. In the example illustrated, method 900 includes receiving a list of associated power tools 120 for a user of the mobile device 110 (at step 905). The list may be received from an external device, for example, the server 150. In some instances, the list may be generated based on user input received via the mobile device 110, for example, the user may build a list by entering on a touch screen of the mobile device 110 a unique identifier of each tool to be included to the list, by tapping power tools 120 or bringing the mobile device 110 in close proximity of the power tools 120 (for example, using the method 400), or both. In some embodiments, the list may be received based on the mobile device 110 receiving a user selection of a particular task on the mobile device 110. The task may be, for example, a particular task (e.g., install a duct, install an electrical switch, or frame a wall) or general type of work (e.g., electrical work, plumbing work, general construction work). In response to the task selection, the mobile device 110 generates (or requests from and receives from the server 150) a list of associated power tools 120 that may be used to complete the task, the list for each selectable task having been created and stored in a memory in advance of the selection. The list of associated power tools 120 may be stored on the memory 320 of the mobile device 110. For the purposes of explanation of the method 900, the list of associated tools is assumed to include the power tools 120A through 120M. However, as discussed, the list may include various other combinations of power tools 120.

The method 900 further includes receiving a user request to check for proximate tools (at step 910). For example, the mobile device 110 may receive a user request to check for proximate power tools 120A through 120M via the input/output interface 350 of the mobile device 110. For example, the user may select a check for proximate tools option on a touch screen of the mobile device 110.

At step 920, the mobile device 110 transmits a short-range advertisement, for example, via the short-range transceiver. At step 930, the mobile device 110 receives signals from the power tools 120A through 120M. The mobile device 110 may not receive a signal from some power tools 120 (for example, power tool 120C shown in FIG. 5) that are not within a range of the mobile device 110. At step 940, the mobile device 110 determines a signal strength for each signal received from the power tools 120A through 120M, similar to steps 440 and 840 described above.

At step 950, the mobile device 110 determines which of the power tools 120A through 120M have a signal strength above a first predetermined threshold. For example, the mobile device 110 may compare the signal strength of the signals from each power tool 120A through 120M received to the first predetermined threshold. The first predetermined threshold may be set, for example, at a level that indicates that a power tool 120 whose signal strength is above the first predetermined threshold is within 3 or 4 feet of the mobile device 110, or within another distance of the mobile device 110 in other examples. For example, the first predetermined threshold may be set to indicate power tools 120 are within 5 feet (e.g., for a workshop), within 10 feet (e.g., for a vehicle or a truck), within 20-30 feet (e.g., for a tool crib), and the like. The first predetermined threshold may be modified by the user (e.g., via selections on the touch screen of the mobile device 110) to adjust the distance to other values. The power tools 120A through 120M having a signal strength above the first predetermined threshold are considered to be proximate the mobile device 110 and may be referred to as proximate power tools 120.

In step 960, the mobile device 110 determines which of the power tools 120A through 120M have a signal strength below the first predetermined threshold, but that which are within wireless range of the mobile device 110. For example, as noted, the mobile device 110 may compare the signal strength of the signals from each power tool 120A through 120M received to the first predetermined threshold in step 950. Those power tools 120A through 120M that provided a signal to the mobile device 110, but which had a signal strength below the first predetermined threshold, are within wireless range of the mobile device 110 (as known based on the receipt of the signals in step 930), but are not considered proximate tools.

In step 970, the mobile device 110 determines for which of the power tools 120A through 120M no signal was received by the mobile device 110 in step 930. These power tools 120A through 120M, for which no signal was received, may be considered power tools 120 that are out of range or missing tools.

In step 980, the mobile device 110 provides an indication of proximate tools. The indication may include a listing of those tools identified as proximate tools in step 950 being displayed on the mobile device 110. In some embodiments, the indication may include the complete list of associated power tools 120 (e.g., the power tools 120A through 120M) with those tools that are proximate tools (as determined in step 950) visually distinguished from those tools that are not proximate tools. The proximate tools may be visual distinguished using underlining, highlighting, differently colored text, adjacent symbols or text, flashing symbols or text, and the like. In some embodiments, the indication may include displaying on the mobile device 110 the complete list of associated power tools 120 and, for each tool, a visual indication of whether the tool is a proximate tool, a tool within wireless range (but not a proximate tool), or a tool outside of wireless range (or missing), as determined in steps 950, 960, and 970. The visual indication may include color coding the list to indicate proximate tools with a different color than tools within wireless range and tools outside of wireless range. The visual indication may also include tags to indicate the proximity status of each tool. In some embodiments, the mobile device 110 may generate separate lists of tools for display including each of i) the proximate tools, ii) the tools within wireless range, and iii) the tools outside of wireless range, and the mobile device 110 may cycle between display screens with the three respective lists based on user input received via a touch screen of the mobile device 110. In some embodiments, the indication includes a graphic illustration of one or more of the power tools 120A through 120M that are proximate, within range, and outside of range, using a diagram similar to FIG. 5. In some embodiments, the mobile device 110 may alert a user at step 980 with an audible or visual message, for example, that one or more of the power tools 120A through 120M is not loaded into a toolbox or truck (i.e., not proximate), is not within wireless range, or both.

Accordingly, in some embodiments, the method 900 enables a user to position the mobile device 110 proximate a tool box, tool crib, or truck used for tool storage, and then initiate a proximate tool check to determine whether a desired set of tools are proximate. This technique enables a user to determine that the desired tools are present in the tool box, tool crib, or truck, as appropriate, and not, for example, left on a jobsite, in use on a jobsite, or inappropriately removed from a jobsite. Additionally, in some embodiments, the method 900 enables a user to determine whether tools suggested for a particular task are proximate the mobile device 110, for example, when the list of associated tools is generated based on a user indication of a task in step 905.

In some embodiments, one or both of the steps 960 and 970 are not included or bypassed in method 900 such that the mobile device 110 proceeds, for example, from step 950 to step 980 to provide the indication of proximate tools.

In some embodiments, one or both of the steps 905 and 970 are not included or bypassed in method 900. In these embodiments, the mobile device 110 provides an indication of proximate tools, tools within wireless range, or both (albeit visually distinguishable) in step 980 in an ad hoc manner and not based on a previously received list of associated tools.

Figure 10:
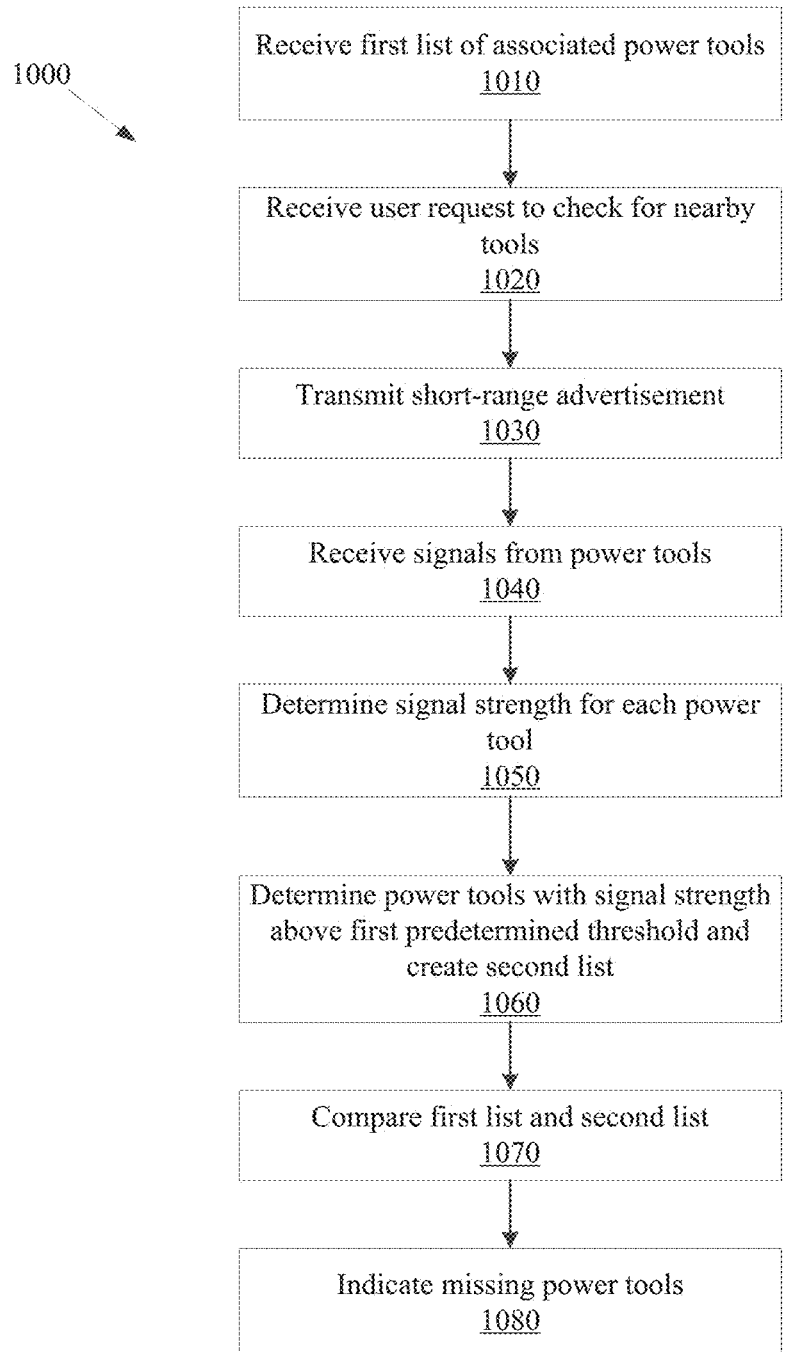
FIG. 10 is a flowchart of a method for comparing nearby tools to an inventory in accordance with some embodiments.

FIG. 10 is one embodiment of a method 1000 for comparing nearby tools to an inventory. In the example illustrated, the method 1000 includes receiving a first list of associated power tools 120 for a user of the mobile device 110 (at step 1010). As described above with respect to step 905, the first list may be received from an external server (e.g., the server 150), from a user input, created based on a user input, and the like. The first list may be stored on the memory 320 of the mobile device 110.

At step 1020, the mobile device 110 receives a user request to check for nearby tools. At step 1030, the mobile device 110 transmits a short-range advertisement, for example, via the short-range transceiver 330. At step 1040, the mobile device 110 receives signals from the power tools 120A through 120M. The mobile device 110 may not receive a signal from some power tools 120 (for example, power tool 120C shown in FIG. 5) that are not within a range of the mobile device 110. At step 1050, the mobile device 110 determines a signal strength for each signal received from the power tools 120A through 120M, similar to steps 440, 840, and 940 described above.

At step 1060, the mobile device 110 determines which of the power tools 120A through 120M have a signal strength above a first predetermined threshold and creates a second list. The second list includes power tools 120A through 120M whose signal strength is above the first predetermined threshold. As described above with respect to step 950 of FIG. 9, the first predetermined threshold may be set at an appropriate level to indicate proximity within an area. The mobile device 110 compares the signal strength of the power tool 120A through 120M to the first predetermined threshold.

At step 1070, the mobile device 110 compares the first list of power tools 120 to the second list created at step 1060. Thereby, the mobile device 110 determines which of the power tools 120 in the first list are present nearby, are out of the proximate area, and are out of range. As described above with respect to steps 960 and 970 of FIG. 9, the power tools 120 whose signal strength is below the first predetermined threshold are considered out of the proximate area and the power tools 120 for which no signal was received are considered out of range.

At step 1080, the mobile device 110 indicates power tools 120 that are missing in the proximate area. The mobile device 110 may group the power tools 120A through 120M whose signal is below the first predetermined threshold or from which no signal was received and display them on a graphical user interface of the mobile device 110. In some embodiments, the mobile device 110 may display the first list and use different indicia (for example, different colors) to indicate the power tools 120 that are nearby and the power tools 120 that are not nearby.

In some embodiments, the power tools 120A through 120M may be configured to work only when within a range of the mobile device 110. That is, the motor controller 250 may frequently (for example, every 1 minute) check for a short-range advertisement from the mobile device 110. The motor controller 250 may prevent driving of the power tool 120 upon detecting the absence of short-range advertisement from the mobile device 110 within the last few minutes (for example, within the last 5 minutes).

In some embodiments of the methods 400, 800, 900, and 1000 discussed above, fewer or additional steps are included, one or more steps are executed in parallel, or one or more steps are executed in a different order than described. In addition, methods 400, 800, 900, and 1000 may use inputs from sensors of the mobile device 110 (e.g., the accelerometer 360) in addition to the received signal strength indication to determine whether the signal strength exceeds a predetermined threshold. That is, steps 450, 850, 950, and 1060 may include detecting an output of the accelerometer 360 to be in a desired range in addition to determining whether the signal strength exceeds a predetermined threshold.

While the above methods 400, 800, 900, and 1000 are described with respect to power tools 120, these methods 400, 800, 900, and 1000 may also be used with other power tool devices. Power tool devices include, for example, motorized power tools (such as the power tools 120 illustrated in FIG. 1), non-motorized electronic tools, battery packs 130, and the like. Non-motorized electronic tools include, for example, work lights, detectors, stud finders, multi-meters, etc. In some examples, the non-motorized electronic tools are powered by the power tool battery packs 130. Such non-motorized electronic tools may be present in the system 100 and communicate with the mobile device 110 like the power tools 120 and the battery packs 130. Accordingly, in some embodiments, the method 400 may be used to establish a connection with the power tool device, add the power tool device to inventory, or both. The method 800 may be used to add a configuration profile to the power tool device. For example, the method 800 may be used to set operational parameters of a work light that enable or disable the work light or particular lights therein, or alter an intensity setting of the work light. The method 900 may be used to indicate nearby power tool devices. The method 1000 may be used to indicate missing power tool devices. In addition, after establishing a connection, the mobile device 110 may retrieve usage data from the power tool devices. Usage data for battery packs 130 may include, for example, a discharge profile, battery pack temperature, etc. Usage data for work lights may include, for example, duration of use, intensity settings, etc. Usage data for other non-motorized electronic tools powered by the battery packs 130 include, for example, readings of the electronic tools, current usage, etc.

Thus, embodiments described herein provide, among other things, an ability to efficiently connect with, communicate with, and track power tool devices. Various features and advantages are set forth in the following claims.

What is claimed is:

1. A method to check for proximate tools with a mobile device, the method comprising:
   receiving, at a user interface of the mobile device, a user request to check for proximate power tool devices;
   transmitting, via a transceiver of the mobile device, a short range advertisement;
   receiving, via the transceiver, signals from a plurality of power tool devices in response to the short-range advertisement to identify the plurality of power tool devices as in-range power tool devices;
   determining, using an electronic processor of the mobile device, signal strength for each power tool device of the plurality of power tool devices based on the signals received via the transceiver;
   determining, using the electronic processor, a first subset of the plurality of power tool devices with signal strength above a predetermined threshold;
   determining, using the electronic processor, a second subset of the plurality of power tool devices with signal strength below the predetermined threshold;
   comparing, using the electronic processor, a list of associated power tool devices with the in-range power tool devices to identify a list of missing power tool devices, the list of associated power tool devices associated with a user of the mobile device;
   providing, via the user interface,
      a first indication that the first subset of the plurality of power tool devices are proximate to the mobile device,
      a second indication that the second subset of the plurality of power tool devices are within wireless range but not proximate to the mobile device, and
      a third indication of the list of missing power tool devices
   determining a type of transceiver used in at least one power tool of the plurality of power tool devices based on the plurality of signals received from the plurality of power tool devices; and
   adjusting the predetermined threshold to a threshold corresponding to the type of transceiver.

2. The method of claim 1, wherein determining the signal strength includes determining an average signal strength over a predetermined period of time.

3. The method of claim 1, further comprising:
   receiving a user input to change the predetermined threshold; and
   changing the predetermined threshold based on the user input.

4. The method of claim 1, further comprising:
   continuously monitoring a second signal strength of a second signal received from a power tool device;
   determining that the second signal strength is increasing above a predetermined rate; and adding the power tool device to the list of associated power tool devices in response to determining that the second signal strength is increasing above the predetermined rate.

5. The method of claim 1, further comprising:
detecting a tapping of a power tool device with the mobile device;
adding the power tool device to the list of associated power tool devices in response to detecting the tapping of the power tool device with the mobile device.

6. The method of claim 5, wherein detecting tapping of the power tool device further comprises:
determining that a second signal strength of a second signal received from the power tool device is increasing above a predetermined increase rate;
determining that the second signal strength exceeds a predetermined signal strength threshold after increasing above the predetermined rate; and
determining that the second signal strength is decreasing above a predetermined decrease rate.

7. A method to check for proximate tools with a mobile device, the method comprising:
receiving, at a user interface of the mobile device, a user request to check for proximate power tool devices;
transmitting, via a transceiver of the mobile device, a short range advertisement;
receiving, via the transceiver, signals from a plurality of power tool devices in response to the short-range advertisement;
determining, using an electronic processor of the mobile device, signal strength for each power tool device of the plurality of power tool devices based on the signals received via the transceiver;
determining, using the electronic processor, a first subset of the plurality of power tool devices with signal strength above a predetermined threshold;
determining, using the electronic processor, a second subset of the plurality of power tool devices with signal strength below the predetermined threshold;
providing, via the user interface, a first indication that the first subset of the plurality of power tool devices are proximate to the mobile device;
determining a type of transceiver used in at least one power tool of the plurality of power tool devices based on the plurality of signals received from the plurality of power tool devices; and
adjusting the predetermined threshold to a threshold corresponding to the type of transceiver.

8. The method of claim 7, further comprising:
providing, via the user interface, a second indication that the second subset of the plurality of power tool devices are within wireless range but not proximate to the mobile device.

9. The method of claim 7, wherein determining the signal strength includes determining an average signal strength over a predetermined period of time.

10. The method of claim 7, further comprising:
receiving a user input to change the predetermined threshold; and
changing the predetermined threshold based on the user input.

11. The method of claim 7, further comprising:
identifying, using the electronic processor, the plurality of power tool devices as in-range power tool devices based on the plurality of signals received from the plurality of power tool devices;
comparing, using the electronic processor, a list of associated power tool devices with the in-range power tool devices to identify a list of missing power tool devices, the list of associated power tool devices associated with a user of the mobile device; and
providing, via the user interface, a second indication of the list of missing power tool devices.

12. The method of claim 11, further comprising:
detecting a tapping of a power tool device with the mobile device;
adding the power tool device to the list of associated power tool devices in response to detecting the tapping of the power tool device with the mobile device.

13. A mobile device comprising:
a transceiver;
a memory; and
an electronic processor coupled to the transceiver and memory and configured to:
receive, at a user interface, a user request to check for proximate power tool devices,
transmit, via the transceiver, a short range advertisement,
receive, via the transceiver, a plurality of signals from a plurality of power tool devices in response to the short-range advertisement,
determine, signal strength for each power tool device of the plurality of power tool devices based on the signals received via the transceiver,
determine a first subset of the plurality of power tool devices with signal strength above a predetermined threshold,
determine a second subset of the plurality of power tool devices with signal strength below the predetermined threshold,
provide, via the user interface, a first indication that the first subset of the plurality of power tool devices are proximate to the mobile device,
determine a type of transceiver used in at least one power tool of the plurality of power tool devices based on the plurality of signals received from the plurality of power tool devices, and
adjust the predetermined threshold to a threshold corresponding to the type of transceiver.

14. The mobile device of claim 13, wherein the electronic processor is further configured to:
provide, via the user interface, a second indication that the second subset of the plurality of power tool devices are within wireless range but not proximate to the mobile device.

15. The mobile device of claim 13, wherein determining the signal strength includes determining an average signal strength over a predetermined period of time.

16. The mobile device of claim 13, wherein the electronic processor is further configured to:
receive a user input to change the predetermined threshold; and
change the predetermined threshold based on the user input.

17. The mobile device of claim 13, wherein the electronic processor is further configured to:
identify the plurality of power tool devices as in-range power tool devices based on the plurality of signals received from the plurality of power tool devices;
compare a list of associated power tool devices with the in-range power tool devices to identify a list of missing power tool devices, the list of associated power tool devices associated with a user of the mobile device; and provide, via the user interface, a second indication of the list of missing power tool devices.

18. A method to check for proximate tools with a mobile device, the method comprising:

receiving, at a user interface of the mobile device, a user request to check for proximate power tool devices;

transmitting, via a transceiver of the mobile device, a short range advertisement;

receiving, via the transceiver, signals from a plurality of power tool devices in response to the short-range advertisement;

determining, using an electronic processor of the mobile device, signal strength for each power tool device of the plurality of power tool devices based on the signals received via the transceiver;

determining, using the electronic processor, a first subset of the plurality of power tool devices with signal strength above a predetermined threshold;

determining, using the electronic processor, a second subset of the plurality of power tool devices with signal strength below the predetermined threshold;

providing, via the user interface, a first indication that the first subset of the plurality of power tool devices are proximate to the mobile device;

detecting a tapping of a power tool device with the mobile device; and adding the power tool device to the list of associated power tool devices in response to detecting the tapping of the power tool device with the mobile device.

\* \* \* \* \*